United States Patent
Potts et al.

(10) Patent No.: US 6,206,224 B1
(45) Date of Patent: Mar. 27, 2001

(54) SHOPPING CADDY AND BAG SYSTEM

(76) Inventors: Kenneth Lee Potts; Debra Lee Potts, both of 462 Santa Cecelia, Solana Beach, CA (US) 92075

( * ) Notice: Subject to any disclaimer, the term of this patent is extended or adjusted under 35 U.S.C. 154(b) by 0 days.

(21) Appl. No.: 09/310,234

(22) Filed: May 12, 1999

(51) Int. Cl.[7] .............................. B65D 1/24; B65D 1/36; B65D 5/36

(52) U.S. Cl. .................. 220/495.06; 220/23.86; 220/507; 224/906; 224/925; 229/117.07

(58) Field of Search ................. 220/495.06, 495.03, 220/9.2, 9.3, 23.4, 507, 62, 62.1, 9.1, 495.01, 23.2, 23.86, 23.83, 558; 224/925, 906, 542; 229/117.07, 117.05; 383/110, 106, 38

(56) References Cited

U.S. PATENT DOCUMENTS

| | | |
|---|---|---|
| 4,226,348 | 10/1980 | Dottor et al. |
| 4,537,313 * | 8/1985 | Workman ............................ 383/110 |
| 4,805,776 * | 2/1989 | Namgyal et al. ................... 383/110 |
| 4,819,793 * | 4/1989 | Willard et al. ...................... 383/110 |
| 4,927,073 * | 5/1990 | Esposito ........................ 229/117.07 |
| 4,951,867 * | 8/1990 | McManus ............................ 224/542 |
| 5,234,116 * | 8/1993 | Kristinsson et al. ................ 224/542 |
| 5,335,845 * | 8/1994 | Liu ................................. 229/117.07 |
| 5,538,148 * | 7/1996 | Indyk ................................... 224/925 |
| 5,713,502 * | 2/1998 | Dixon ................................. 224/542 |
| 5,829,655 * | 11/1998 | Salopek .............................. 224/542 |
| 6,015,071 * | 1/2000 | Adomeit et al. ..................... 224/925 |

* cited by examiner

Primary Examiner—Allan N. Shoap
Assistant Examiner—Niki M. Eloshway
(74) Attorney, Agent, or Firm—Freling E. Baker; Baker & Maxham

(57) ABSTRACT

A shopping caddy system including a multi-compartmented caddy and a plurality of collapsible bags that fit into the compartments of the caddy. The caddy is preferably collapsible so that its end panels and intermediate dividers form a stack. The end panels of the caddy can preferably folded downward to provide extra support when the endmost caddy compartments are not occupied. The caddy and bags are preferably sized and shaped to allow close engagement between the caddy and the bags when the caddy is in the open position and the collapsible bags are in the open position.

18 Claims, 4 Drawing Sheets

SHOPPING CADDY AND BAG SYSTEM

BACKGROUND OF THE INVENTION

1. Field of the Invention

The present invention relates to a shopping caddy system and pertains more particularly to an arrangements for improved collapsibility and engagement of shopping caddies and associated shopping bags.

2. Discussion of the Related Art

Groceries are typically bagged at the checkout counter in a plastic bag or a collapsible paper bag. The paper and plastic bags are generally considered to be disposable items. Alternatively, reusable canvas bags are sometimes used to transport groceries. Any of the various types of grocery bags are conventionally transported from the store in a cargo area of a motor vehicle, such as the trunk of a car.

However, it has been conventionally recognized that bags can tip, shift and spill. In response to this problem, grocery bag holders (or caddies) have been used to secure grocery bags in the motor vehicles. However, possibly due in part to the expense and/or cumbersomeness of conventional shopping caddies, these caddies are not yet widely used.

U.S. Pat. No. 4,226,348 to Dottor et al. discloses a grocery bag holder with a rigid bottom member. The upstanding sides of the grocery bag holder of Dottor et al. can be folded down or collapsed down to lie flat along the a bottom mat. However, the bottom mat itself is not collapsible.

SUMMARY OF THE INVENTION

The present invention relates to improved designs for shopping caddies and shopping bags for use in shopping caddies. At least some embodiments of the present invention provide a shopping caddy system which is lighter in weight, more easier portable and less expensive than conventional shopping caddy systems. At least some embodiments of the present invention provide a shopping bag caddy system where the bags are more reliably secured and engage more effectively with the caddy than in conventional systems.

In some embodiments of the present invention, upstanding, somewhat rigid end panels can be rotated or folded downwards against an intermediate divider and/or the bottom panel of the shopping caddy. This gives the bottom of the caddy added rigidity and a larger effective base when a compartment formed between the end panel and the intermediate divider is empty of bags.

In some embodiments of the present invention, the caddy can be collapsed so that substantially its end panels and intermediate dividers form a compact stack, having a relatively small "footprint" corresponding to the length and width of the end panels. This is an advantage over collapsible caddies with rigid bottom panels because the "footprint" for these caddies in the collapsed position would correspond to the length and width of the rigid and relatively large bottom panel. On the other hand, the end-to-end collapsible embodiments of the present invention work especially well in conjunction with the rigid downward-folding end panels described above.

According to first aspect of the invention, a device for holding bags in an upright position includes a first end panel, a second end panel, a first divider panel and a base. The first and second end panels are somewhat rigid. Although many preferred embodiments of "rigid" panels will be capable of some degree of elastic deformation as will be discussed in detail below, they are to be distinguished from pliable fabric, such as nylon or other fabric, which is not herein considered to be rigid.

The base constrains the first end panel, the second end panel and the first divider panel to each other so that the first divider panel is located at least substantially between the first end panel and the second end panel. The base allows the first end panel to rotate between a first angular orientation substantially parallel to the first divider panel and a second angular orientation inclined to the first divider panel. For example, the first end panel will generally be placed in the first orientation when the caddy is to receive a grocery bag or other articles between the substantially parallel and spaced apart first end panel and the first divider panel.

On the other hand, the base will generally be in the second orientation when the caddy is not going to hold a grocery bag in the compartment between the first end panel and the first divider panel. In the second angular orientation, the inclined rigid first panel can help the caddy from tipping over by providing added support to the first divider panel and/or by providing a longer effective base for the caddy. In preferred embodiments, the first end panel will be put in the second angular orientation by being rotated 90 degrees so that it is lying along the bottom plane of the caddy.

According to a second aspect of the present invention, a device for holding bags includes a first end panel, a second end panel, a first divider panel and a base. The base constrains the first end panel, the second end panel and the first divider panel to each other so that the first divider panel is located at least substantially between the first end panel and the second end panel. The base is collapsible between a first position with the first end panel, the second end panel and the first divider panel being spaced apart and a second position with the fist end panel, the second end panel and the first divider panel being in close proximity and substantially parallel to each other.

As used herein, "spaced apart" means spaced away from each other so that a reasonably-sized grocery bag can fit in between successive panels. As used herein, "in close proximity" means either contiguous or at least close enough together so that a reasonably-sized grocery bag cannot fit between successive panels.

According to a third aspect of the present invention, a shopping bag caddy system includes a shopping bag caddy and first collapsible shopping bag and a second collapsible shopping bag. The collapsible shopping bag caddy defines a first shopping bag receiving area (i.e., compartment) and a second shopping bag receiving area for receiving and engaging the first and second shopping bags. The shopping bag caddy is collapsible between a caddy open position and a caddy closed position. The first and second collapsible shopping bags are made substantially of pliable fabric collapsible between an open position and a bag closed position.

According to a fourth aspect of the present invention, a bottle bag includes a bag portion, a collapsible divider and at least one handle. The bag portion is substantially made of a pliable material and generally shaped in the shape of a rectangular prism. The bag portion defining an internal volume. The collapsible divider sections the internal area into at least four compartments for holding wine bottles or the like. The collapsible divider collapses and folds flat to allow the bottle bag to collapse.

BRIEF DESCRIPTION OF THE DRAWINGS

The nature, goals, and advantages of the invention will become more apparent to those skilled in the art after considering the following detailed description when read in connection with the accompanying drawing, illustrating by way of examples the principles of the invention, in which like reference numerals identify like elements throughout, wherein.

DESCRIPTION OF THE PREFERRED EMBODIMENTS

Figure 1:
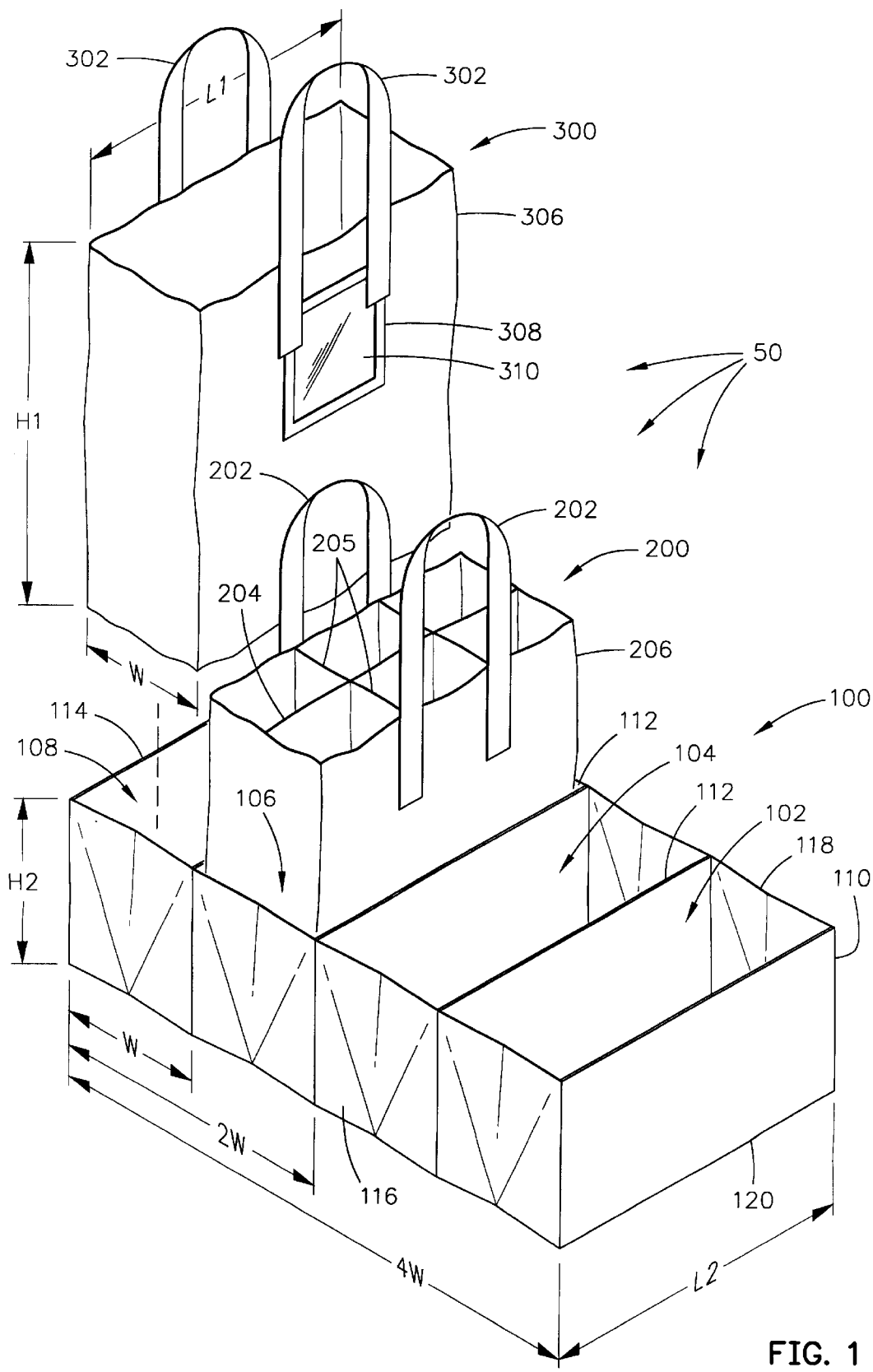
FIG. 1 is a perspective view of a shopping bag caddy system, including a shopping caddy and two shopping bags, according to the present invention.

FIGS. 1 to 8 show a shopping bag caddy system 50 including a shopping caddy 100, a bottle bag 200 and a shopping bag 300. Caddy 100 holds the bags upright, for example in the trunk of a car. Although this preferred embodiment caddy 100 is not mounted to a car, bottle bag 200 and shopping bag 300 will generally translate (e.g., slide around) and tip to a lesser extent when they are constrained to each other through caddy 100 than if they were placed separately in a car. While the caddy system was devised primarily for groceries, it may have many other uses such as shipping and storage of other articles.

As explained below in more detail, this preferred caddy 100 is advantageous because it collapses in the end-to-end direction, thereby allowing the collapsed caddy 100 to have a smaller length and width footprint than it would if collapsed in a side-to-side direction or top-to-bottom direction. Also, end panels 110, 114 can be rotated inwards toward intermediate panels 112 to lie flat against the bottom panel 120 of the caddy. This feature can be used to provide a longer and more rigid base for the caddy when one or both endmost compartments are not filled with and supported by shopping bags. This is especially important because bottom panel 120 is pliable to allow for the end-to-end caddy collapsing action mentioned earlier in this paragraph.

First the structure of bags 200, 300 will be discussed in detail, followed by a detailed discussion of structure and operation of caddy 100.

Structure of Bag 300

Bag 300 is a grocery bag including a collapsible main body 306 made of nylon or other suitable pliable material, two easy-grip nylon webbing (or equivalent) handles 302, a slip pocket 310 and border 308. Main body 306 comprises pliable, flat fabric panels sewn into the shape of a rectangular prism with an open top. Because the main body is preferably made of nylon or similar material, the bag is sturdy and reusable, and will not fail under grocery toting conditions, as plastic and paper grocery bags sometimes do. Also, the bag 306 is easier to open and manipulate than conventional paper and plastic grocery bags.

Slip pocket 310 is a sheet of flexible, transparent material surrounded by border 308. Pocket 310 and border 308 are sewn to bag body 306 along three edges, to form a pocket which is handy for holding shopping lists, receipts or coupons.

Although nylon bag 306 is a preferred embodiment of a grocery bag for the present invention, others bags, such as conventional paper, canvas, cloth or plastic grocery bags can also be advantageously used in caddy system 50. The bags and the covering of the panels of the caddy may be made of any number of suitable pliable materials such as vinyl and the like, woven fabrics such as canvas, cotton, nylon, Kevlar and the like. In fact, caddy 100 may be especially beneficial when used to constrain plastic grocery bags, because these may be more susceptible to rolling, shifting and tipping than paper or cloth bags.

Figure 7:
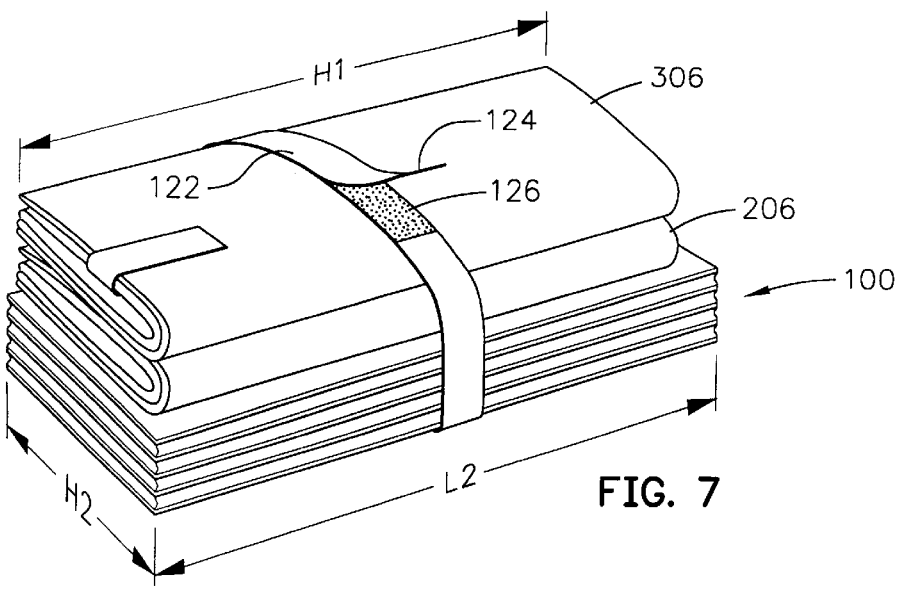
FIG. 7 is a perspective view of the shopping bag caddy system in a collapsed and strapped position.

Bag 306 is collapsible between an open position (shown in FIG. 1) and a closed position (shown in FIG. 7). Bag 306 is preferably collapsed by folding the two larger upstanding panels downwards to lie along the base of the bag, while the two smaller panels are collapsed toward the interior of the bag between the folded-down larger panels. After the bag is partially collapsed in this manner, the base and folded-down larger panels are folded in half in the lengthwise direction as shown in FIG. 7.

Because of the height H1 of the bag is approximately equal to length L2 of caddy 100, when bag 306 is collapsed and stacked with caddy 100 with its heightwise dimension H1 parallel to the lengthwise dimension L2 of the caddy 100, then the bag-and-caddy stack will be approximately flush at its ends. Because length L1 of bag 306 is approximately twice as long as height H2 of caddy 100, when bag 306 is collapsed and folded in half in the lengthwise direction (as shown in FIG. 7), then the bag-and-caddy stack will be approximately flush along its sides. Therefore, by carefully choosing the dimensions of bag 306 and caddy 100, the bag and caddy can be collapsed and stacked in a neat-looking, flush stack.

In this preferred embodiment, length L1 of bag 306 is approximately equal to length L2 of caddy 100, and width W of bag 306 is approximately equal to width W of each compartment 102, 104, 106, 108 of caddy 100 (when the caddy is in a fully open position as shown in FIG. 1). This means that the rectangular prismatic bag 306 will engage well with the walls and base and base of any of the rectangular prismatic compartments 102, 104, 106, 108. Because the size and shape of the reusable bag 306 and caddy compartments are complementary, the bag is snugly supported and constrained within the caddy.

This is a powerful advantage of using a caddy system, including reusable bags and caddy, of the present invention over using a conventional caddy which is not provided with complementary bags. If the bags are not manufactured with the caddy in mind, the bags provided at the grocery store may be too big to fit in the caddy. On the other hand, if the bags provided at the grocery store are smaller than the caddy compartments, then the bags may shift or tip within the confines of the caddy compartment. The bag and caddy system can be designed to provide optimum, snug engagement between caddy and bags.

Nonetheless, it is noted that the caddies according to the present invention can also be used with grocery bags provided by the grocery store. In this case, bags which are too large, or bags which have the wrong shape, may be gathered and/or partially collapsed to fit in the compartments of caddy 100. If the bags are too small, it may be possible to minimize shifting and tipping within the caddy 100 by placing more than one small bag in a single compartment.

Although the complementary bag and caddy feature of the present invention is being explained with reference to a preferred embodiment having a rectangular prismatic bag 306 and rectangular prismatic caddy compartments 102, 104, 106, 108, other complementary and engaging shapes may be used, such as cylinders, other polygonal prisms, parabolic shapes and the like.

Structure of Bottle Bag 200

Bottle bag 200 includes nylon bag body 206, two nylon handles 202, widthwise divider 204 and lengthwise dividers 205. Dividers 204, 205 divide the interior of the bag into six approximately equal compartments of an appropriate size for holding and protecting glass wine bottles. Alternatively, the dividers may be placed to divide the interior space of bag 206 into unequal compartments, or to divide the space into greater than or fewer than six compartments.

Although bag 206 shares some characteristics with conventional cardboard boxes with internal dividers used to transport glass liquor bottles to liquor stores, bottle bag 206 has many advantages over such conventional boxes.

First, bottle bag 206 and handles 202 are made of pliable, thermally-insulative nylon fabric, so that it will hold up better than cardboard especially in the presence of moisture which often condenses on cold beverage bottles. Second, handles 202 extend outwards from bag body 206 for easier lifting and hand-carrying. Third, bottle bag 206 is dimensioned to engage with open compartments of caddy 100 and to collapse down to a footprint which forms a flush stack with caddy 100 and bag 306 (see FIG. 7). Fourth, dividers 204, 205 are sewn to the upstanding walls of bag body 206 so that the dividers 204, 205 do not become separated from the bag. Fifth, dividers 204, 205 are not sewn to the bottom of the bag 206, which may facilitate easier collapsibility of bottle bag 200. Sixth, dividers 204, 205 and the base of bag body 206 are padded and thermally insulated to protect bottles from mechanical and thermal shifts and shocks. Seventh, dividers 204, 205 are pliable so that they can be folded when the bag is collapsed without loss of strength.

Structure of Caddy 100

As shown in FIG. 1, caddy 100 includes first end panel 110, three intermediate panels 112, second end panel 114, a first side panel 116, a second side panel 118 and a bottom panel 120. The panels 110, 112, 114, 116, 118, 120 define four rectangular prismatic compartments 102, 104, 106, 108. By designing caddies with more or fewer intermediate divider panels 112, different numbers of compartments may be obtained.

Side panels 116, 118 and bottom panel 120 are defined by at least one base panel made of pliable nylon fabric. End panels 110, 114 and intermediate panels 112 are formed as somewhat rigid boards (preferably made of plastic, rubber or hardboard like condensed cardboard or the like) encased in a suitable pliable sheet such as nylon. The "somewhat" rigid boards are preferably more flexible and elastic than a cardboard box or the wire mesh of a typical shopping cart, but much more rigid than cloth. The desired balance of rigidity and flexibility would be something like that provided by the sole of a light duty shoe. This intermediate degree of rigidity provides good support for bags in caddy 100, while allowing plenty of give to prevent breakage of the panels. Hereinbelow, the word "rigid" will be used to generically denote the preferable intermediate degree of rigidity described above, as well as higher degrees of rigidity.

The nylon casing of the rigid boards of panels 110, 112, 114 allows the panels to be sewn to the nylon side and bottom panels 116, 118, 120 and provides the caddy with an attractive, uniform color and texture.

Caddy 100 further includes a strap 122 with first velcro end 124 and second velcro end 126. A portion of strap 122 in sewn to bottom panel 120. The strap is long enough to hold caddy 100 and one or more bags 206, 306 in a collapsed and stacked state. Because of the end-to-end collapsing action of caddy 100, the stack held by strap 122 has a small footprint. Because of the careful dimensioning of the caddy 100 and bags 306, 206, the stack is nearly flush along its edges. This makes for a compact, attractive stack which is easier to carry during shopping excursions, and allows for easy access to the reusable bags 306, 206 at check-out time. Because caddy system 50 forms such a nice stack, strap 122 is a very useful adjunct of the preferred caddy system 50.

Because the ends 124, 126 are formed with complementary velcro portions, they are detachably attachable so that the length of the loop circumscribed by strap 122 can be varied depending on the height of the stack, which in turn depends upon the number of bags the user chooses to carry with her. Of course, other adjustable attachably detachable structures could be used, such as buttons, snaps, magnets, tieable cord and so on.

At least some conventional caddies are made to be mounted to a car trunk. In these conventional caddies, the mounted caddy prevents tipping or translation of the caddy and its bags. In this preferred embodiment, there are no means to mount caddy 100, so the manner in which unmounted caddy 100 prevents motion and tipping of the grocery bags will be described in some detail.

First, with resect to tipping, when a bag 306 is used without the caddy, its weight is distributed over a fairly small width W. When forces tend to rotate the bag about its bottom edge, and to thereby tilt up the base of the bag about one of its bottom edges, then the countervailing weight of the bag will act only along a fairly short moment arm W and will only produce a limited moment to resist this tipping.

On the other hand, when two bags 306, 206 are constrained by caddy 100 to act as a unit, the combined weight of the bags acts along longer moment arm 2W so that the weight of the bags produces a much greater moment to resist the tipping forces. Similarly, if all four compartments 102, 104, 106, 108 are filled with bags, the unit has a base which is 4W long. This long effective base is very resistant to tipping due to its length.

Second, with respect to translation of the bags, the constraint provided by caddy 100 also helps to prevent translation. This is because the combine weight of bags 206, 306 result in greater static frictive forces that must be overcome before caddy 100 will move along the surface upon which it rests. It is also noted that some limited degree of translation of the caddy, for example within the trunk of a moving car, will generally not cause damage to groceries.

While the preferred caddy 100 does not have mounting structures, it is noted that caddy 100 could be modified to include mounting structures.

End-to-End Collapsing Feature of Caddy 100

Figure 2:
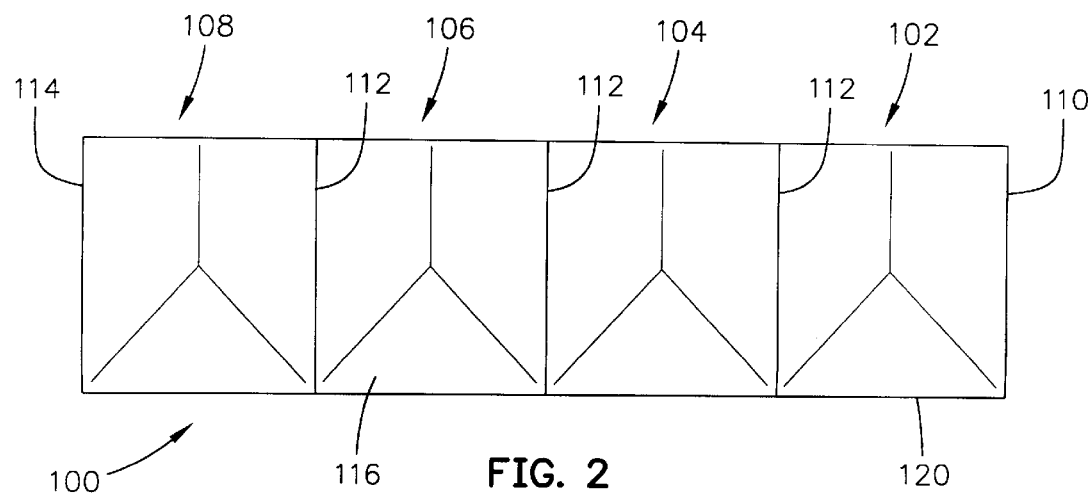
FIG. 2 is a side view of the shopping caddy of FIG. 1 in an open position.
Figure 3:
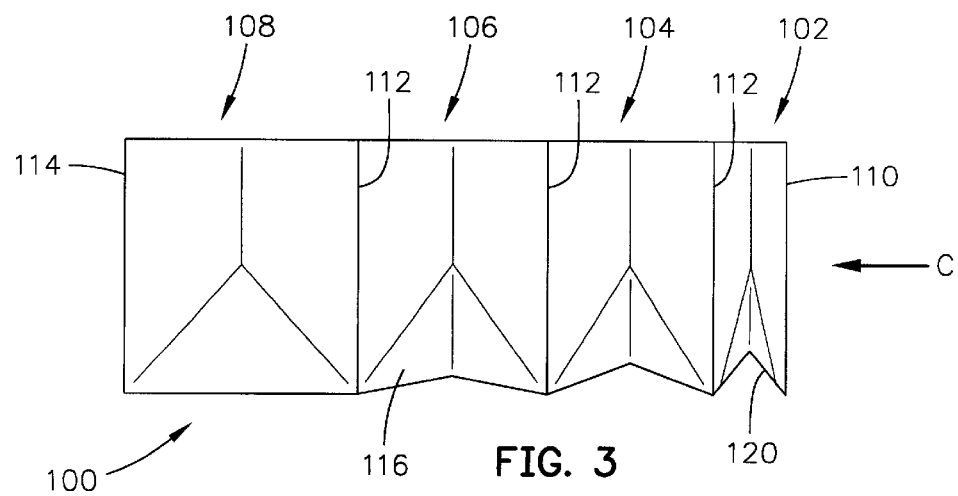
FIG. 3 is a side view of the shopping caddy of FIG. 1 in a partially collapsed position.

As mentioned above, caddy 100 collapses in the end-to-end direction. This is shown in detail in FIGS. 2 to 4 and 5 to 6. FIG. 2 shows caddy 100 in a fully open position with panels 110, 112, 114 being spaced apart to form compartments 102, 104, 106, 108. FIG. 3 shows caddy 100 in a partially closed position with first end panel 110 moved in direction C toward the opposite second end panel 114. Pliable nylon fabric side panels 116, 118 fold inward to allow this collapsing motion.

Figure 4:
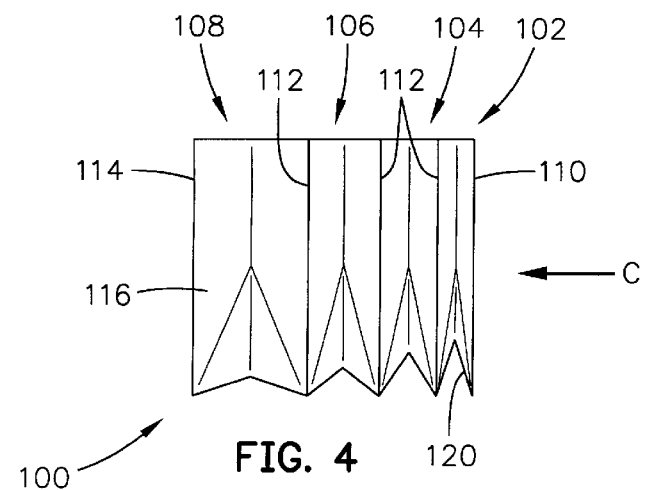
FIG. 4 is a side view of the shopping caddy of FIG. 1 when the caddy has almost reached the fully collapsed position.
Figure 5:
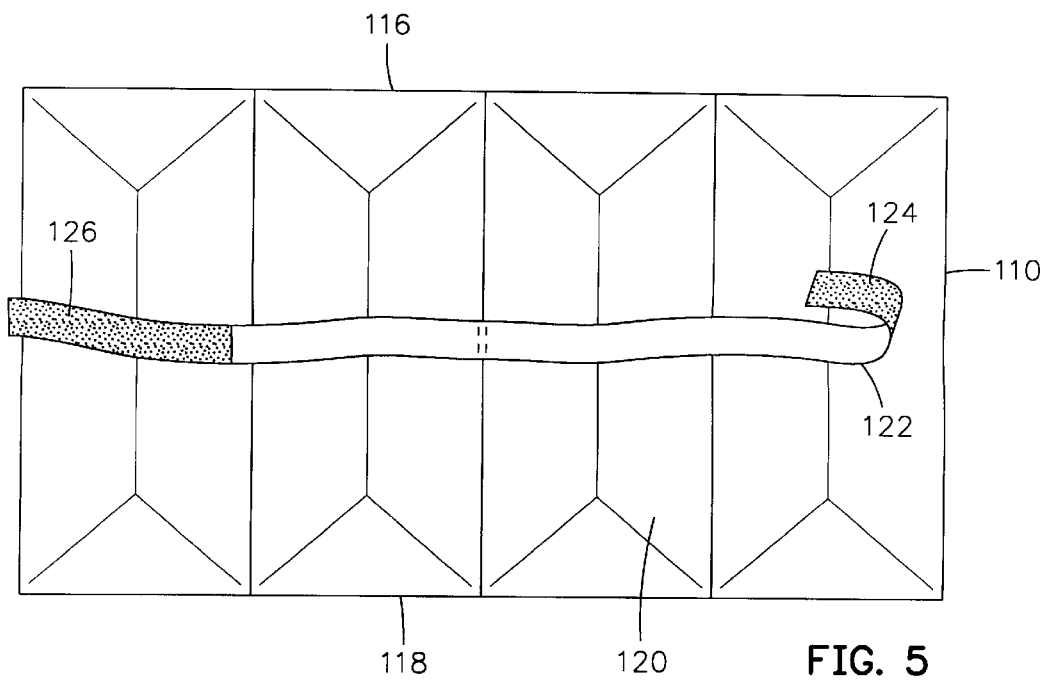
FIG. 5 is a bottom view of the shopping bag caddy in the open position.
Figure 6:
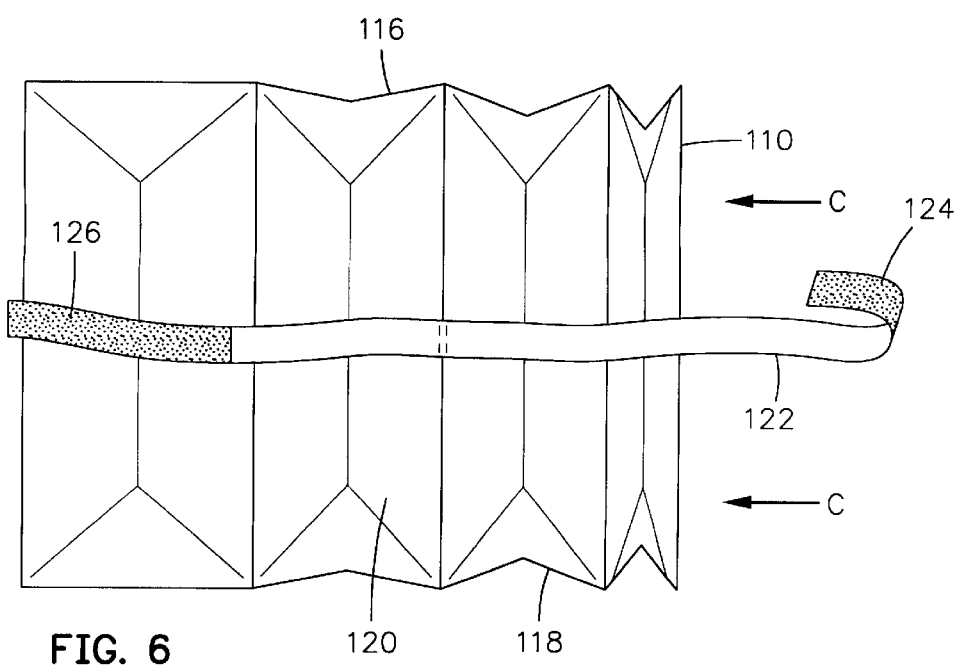
FIG. 6 is a bottom view of the caddy in the partially collapsed position.

FIG. 4 shows a further partially collapsed position, with first end panel 110 and each of intermediate side panels 112 moved in direction C toward close proximity with each other and with second end panel 114. FIG. 7 shows caddy 100 in the collapsed position with panels 110, 112, 114 being in such close proximity that they actually come into contact with each other to form a very compact stack. Alternatively, the panels may be brought into close proximity without quite touching each other.

This end-to-end collapsing brings out one of the powerful advantages of the present invention, which is the balance between sturdiness, support and collapsibility of caddy 100. More specifically, side panels 116, 118 and bottom panel 120 are large in size. However, these large panels are made of pliable material such as nylon fabric so that they fold up and do not significantly increase the size of the caddy in the collapsed position. On the other hand, rigid, parallel panels 110, 112, 114 provide good support for bags and allow the caddy to hold its shape when open and empty. Therefore, the end-to-end collapsing feature of caddy 100 allows several somewhat conflicting design objectives to be simultaneously accommodated.

Fold Down End Panels Feature of Caddy 100

Figure 8:
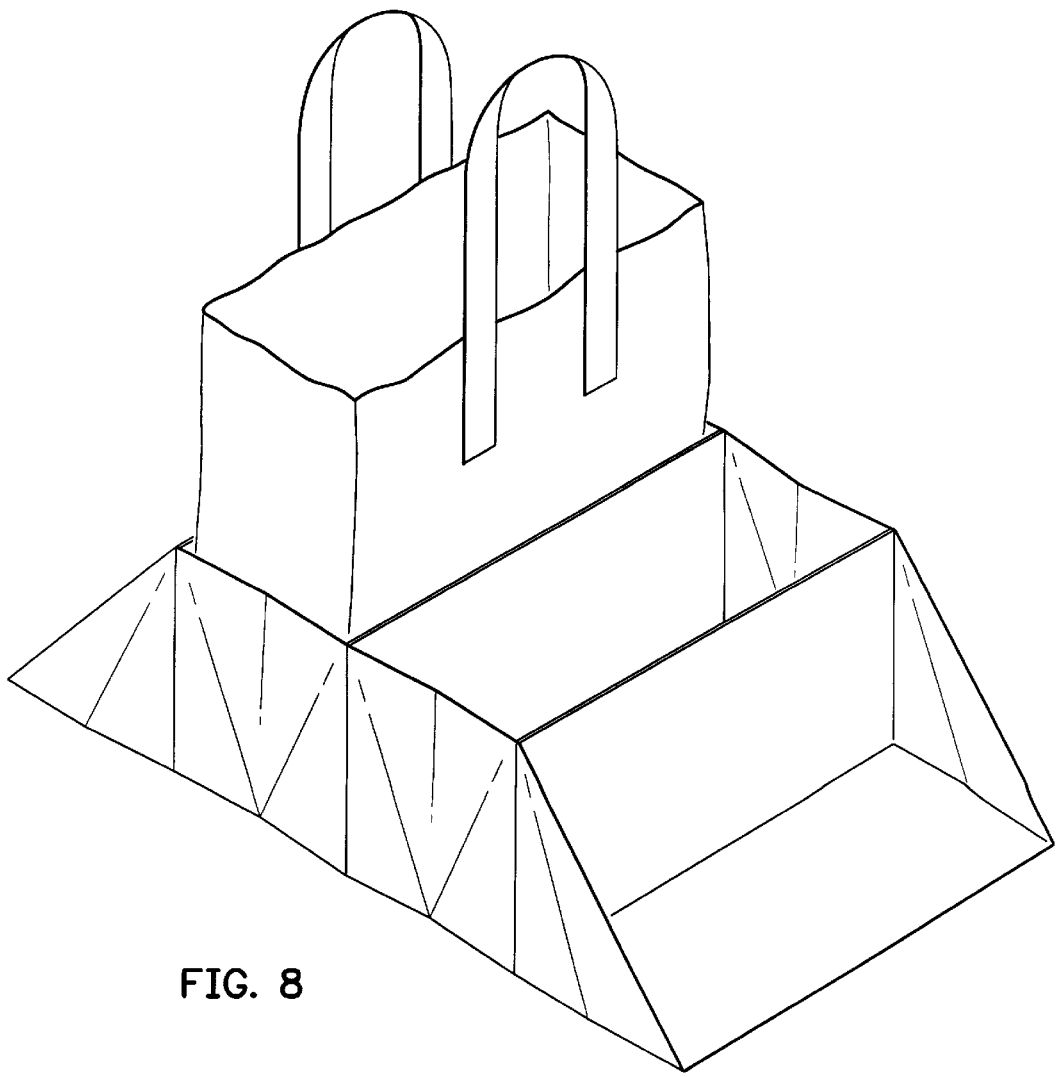
FIG. 8 is a perspective view of the shopping bag caddy of FIG. 1 with both end panels rotated to be inclined relative to the divider panels.

As shown in FIG. 8, another feature of caddy 100 is the folding down action of end panels 110, 114. First end panel 110 can be rotated in direction R1 down and inward relative to intermediate panels 112. As shown in FIG. 8, first end panel 110 has been rotated all the way down into a position lying along bottom panel 120, so that first end panel 110 is inclined to be substantially perpendicular to intermediate panels 112. Second end panel 114 can be rotated in direction R2 down and inward relative to intermediate panels 112. As shown in FIG. 8, second end panel 110 has been rotated only part of the way, so that second end panel 110 is inclined at an angle to intermediate panels 112.

In the preferred caddy 100, the end panels can be rotated because they are sewn to pliable nylon bottom panel 120 along their axis of rotation, and because pliable nylon side panels 116, 118 collapse and fold to allow the rotational motion. It is noted that such rotational motion could be provided for in other ways such as by a hinge and other hardware which would allow rotational movement between the end panels and the side and bottom panels of caddy 100.

First end panel can be snugly folded all the way down because height H2 of first end panel 110 is approximately equal to width W of compartment 102. By approximately matching these dimensions, first panel 110 can be held in the folded down orientation by holding a portion of the bottom panel in tension between the seam joining intermediate panel 112 to bottom panel 120 and the seam joining first end panel 110 to bottom panel 120. This tension detachably engages first end panel 110 in the folded down position so that it does not pop back up under the influence of small mechanical shocks.

When the first compartment 102 is not holding a bag, first end panel 110 is preferably rotated all the way down to lie flat against bottom panel 120 in order to make the effective width of the base of the caddy longer and thereby to help prevent tipping in the counter-R1 direction. Similarly, second end panel can be folded down to make the effective width of the base longer and thereby prevent tipping in the counter-R2 direction. If this way, tipping can be minimized even when caddy 100 holds only one or two bags.

Although the end panels 110, 114 of preferred caddy 100 can be folded to lie down against bottom panel 120, the end panels could be alternatively dimensioned relative to the width of the compartments 102, 108 so that they can be only partially rotated downward before physical interference with divider panels 112 blocks further rotation. In this alternative embodiment, the end panels would act as sort of a flying buttress, both supporting intermediate panels in the upright position while also helping to prevent tipping of the entire caddy by increasing the effective length of the base.

Conclusion

While we have illustrated and described my invention by means of specific embodiments, it is to be understood that numerous changes and modifications may be made therein without departing from the spirit and the scope of the invention as shown in the appended claims.

What is claimed is:

1. A device for holding bags in an upright position, the device comprising:

a rigid first end panel;

a rigid second end panel;

a rigid first divider panel; and a pliable base defining two side panels and a bottom panel connected to at least side edges of said end panels and divider panel and structured to constrain the first end panel, the second end panel and the first divider panel to each other so that the first divider panel is located substantially between the first end panel and the second end panel and so that the base is structured to be collapsible between a closed position with the first end panel, the second end panel and the first divider panel being in close face to face proximity to each other and an open position with the second end panel and the first divider being spaced apart and the first end panel is moveable between a first angular orientation substantially parallel to the first divider panel and a second angular orientation inclined substantially perpendicular to the first divider panel.

2. The device of claim 1 wherein:

the side panels and bottom panel is structured to be collapsible between a closed position with the first end panel, the second end panel and the first divider panel being in face to face engagement with each other and an open position with the second end panel and the first divider being spaced apart; and the first end panel is rotatable between the first angular orientation and the second angular orientation when the base is in the open position.

3. The device of claim 2 wherein the base comprises:

a first side panel made of pliable fabric;

a second side panel made of pliable fabric; and a bottom panel made of pliable fabric, with the first end panel being connected to the bottom panel so that the pliability of the bottom panel provides for the rotation of the first end panel between the first angular orientation and the second angular orientation, and with the pliability of the first side panel, the second side panel and the bottom panel providing for the collapsing of the base between the open position and the closed position.

4. The device of claim 1 wherein the first end panel has a height which is substantially equal to the distance between the first divider panel and the first end panel when the base is in the open position and the first end panel is in the first angular orientation.

5. A device for holding bags, the device comprising:

a first end panel having a first side edge, a second side edge and a bottom edge;

a second end panel having a first side edge, a second side edge and a bottom edge;

a first divider panel having a first side edge, a second side edge and a bottom edge; and a pliable base defining two side panels and a bottom panel connected to at least side edges of said end panels and divider panel and structured to constrain the first end panel, the second end panel and the first divider panel to each other so that the first divider panel is located substantially between the first end panel and the second end panel, with the base being collapsible between an open position with the first end panel, the second end panel and the first divider panel being spaced apart and substantially parallel to each other and a closed position with the first end panel, the second end panel and the first divider panel being in close substantially face to face engagement and substantially parallel to each other.

6. The device of claim 5 herein the base comprises:

a first side panel connected to the first side edge of the first end panel, the first side edge of the second end panel and the first side edge of the divider panel; and a second side panel connected to the second side edge of the first end panel, the second side edge of the second end panel and the second side edge of the first divider panel.

7. The device of claim 6 wherein the first side panel and second side panel are made of pliable fabric material.

8. The device of claim 6 wherein the bottom panel is made of pliable fabric material and connected to the bottom edge of the first end panel, the bottom edge of the second end panel and the bottom edge of the divider panel.

9. The device of claim 5 further comprising a second divider panel constrained by the base to be located substantially equal distance between the first divider panel and the second end panel.

10. A shopping bag caddy system comprising:

a collapsible shopping bag caddy defining a first shopping bag receiving area and a second shopping bag receiving area, the shopping bag caddy comprising a rigid first end panel, a rigid second end panel, a rigid first divider panel, and a pliable base defining two side panels and a bottom panel connected to at least side edges of said end panels and divider panel and structured to constrain the first end panel, the second end panel and the first divider panel to each other so that the first divider panel is located substantially equal distance between the first end panel and the second end panel, the shopping bag caddy being collapsible between a caddy open position and a caddy closed position wherein said divider panel and end panels are in substantially face to face engagement;

a first collapsible shopping bag made substantially of pliable fabric collapsible between a first bag open position and a first bag closed position, with the first bag being sized and shaped to engage the first receiving area when the caddy is in the caddy open position and the first bag is in the first bag open position; and a second collapsible shopping bag made substantially of pliable fabric collapsible between a second bag open position and a second bag closed position, with the second bag being sized and shaped to engage with the second receiving area when the caddy is in the caddy open position and the first bag is in the second bag open position.

11. The caddy system of claim 10 wherein the caddy further defines a third receiving area.

12. The caddy system of claim 11 wherein the caddy further defines a fourth receiving area.

13. The caddy system of claim 10 wherein:

the first receiving area is compartment generally shaped as a rectangular prism when the caddy is in the caddy open position; and the first bag is generally shaped as a rectangular prism when the first bag is in the first bag open position.

14. The caddy system of claim 10 wherein:

the shopping bag caddy has a length;

the first bag has a first bag height; and the height of the first bag is approximately equal to the length of the shopping caddy.

15. The caddy system of claim 10 wherein:

the first bag has a length;

the shopping bag caddy has a height; and the length of the first bag is approximately twice the height of the shopping bag caddy.

16. The caddy system according to claim 10 further comprising a transparent pocket connected to the first bag.

17. A caddy system according to claim 10 wherein, one of said first and second collapsible shopping bag is a bottle bag comprising:

a bag portion substantially made of a pliable material and generally shaped in the shape of a rectangular prism, the bag portion defining an internal volume;

a collapsible divider structured to section the internal area into at least four compartments; and at least one handle.

18. A bottle bag according to claim 17 wherein:

the collapsible divider is padded;

the collapsible divider is thermally insulative; and the bag portion is substantially made of nylon fabric.

* * * * *